(12) United States Patent
Zakharov et al.

(10) Patent No.: US 12,521,040 B2
(45) Date of Patent: Jan. 13, 2026

(54) WEARABLE ACTIVITY PARAMETER COLLECTING DEVICE AND MOUNTING UNIT THEREFOR

(71) Applicant: VIVIOR AG, Zurich (CH)

(72) Inventors: Pavel Zakharov, Volketswil (CH); Michael Mrochen, Zug (CH)

(73) Assignee: CARL ZEISS VISION INTERNATIONAL GMBI, Aalen (DE)

( * ) Notice: Subject to any disclaimer, the term of this patent is extended or adjusted under 35 U.S.C. 154(b) by 827 days.

(21) Appl. No.: 17/297,568

(22) PCT Filed: Dec. 5, 2019

(86) PCT No.: PCT/EP2019/083821
§ 371 (c)(1),
(2) Date: May 27, 2021

(87) PCT Pub. No.: WO2020/120281
PCT Pub. Date: Jun. 18, 2020

(65) Prior Publication Data
US 2021/0345912 A1 Nov. 11, 2021

(30) Foreign Application Priority Data
Dec. 11, 2018 (EP) .................................. 18211553

(51) Int. Cl.
*A61B 5/11* (2006.01)
*A61B 5/00* (2006.01)
*G06F 21/60* (2013.01)

(52) U.S. Cl.
CPC .......... *A61B 5/1118* (2013.01); *A61B 5/0002* (2013.01); *A61B 5/6803* (2013.01); *G06F 21/602* (2013.01); *A61B 2560/0242* (2013.01)

(58) Field of Classification Search
CPC ............ H04W 12/033; H04W 12/0433; A61B 5/0008; A61B 5/6833; A61B 5/1123;
(Continued)

(56) References Cited

U.S. PATENT DOCUMENTS

2008/0121688 A1* 5/2008 Harrop ............. G06K 19/06028
235/494
2011/0024491 A1* 2/2011 Jamali ................... G16H 30/20
235/375
(Continued)

FOREIGN PATENT DOCUMENTS

| EP | 3381351 | 10/2018 |
|---|---|---|
| JP | 2003220052 | 8/2003 |

OTHER PUBLICATIONS

European Patent Office, International Search Report and Written Opinion for International Application No. PCT/EP2019/083821. Jan. 10, 2020.

(Continued)

*Primary Examiner* — Jennifer Robertson
*Assistant Examiner* — Elina Sohyun Jang
(74) *Attorney, Agent, or Firm* — Williams Mullen; Thomas F. Bergert

(57) ABSTRACT

The present disclosure relates to a wearable activity parameter collecting device, a mounting unit for detachably mounting the wearable activity parameter collecting device to a wearable device and to a system comprising the wearable activity parameter collecting device and the mounting unit.

9 Claims, 7 Drawing Sheets

(a)

(b)

(58) Field of Classification Search
CPC ... A61B 5/4806; A61B 5/0015; A61B 5/1118; A61B 5/0002; A61B 5/6803; A61B 2560/0242; A61B 2562/08; A61B 5/11; A61B 3/113; A61B 5/6831; A61B 5/0022; A61B 5/02438; A61B 5/14551; A61B 90/96; A61B 90/98; A61B 2560/0214; A61B 2560/0443; A61B 2560/0475; A61B 5/444; A61B 5/0095; A61B 5/7264; A61B 5/746; A61B 5/445; A61B 5/6898; A61B 5/7267; A61B 5/7405; A61B 5/742; A61B 5/442; A61B 5/7475; A61B 5/0013; A61B 5/004; A61B 5/6897; A61B 5/443; A61B 5/441; A61B 5/0077; G16H 10/65; G16H 80/00; G16H 50/20; G16H 20/00; G16H 50/30; G16H 50/70; G16H 20/10; G16H 20/60; G16H 30/20; G16H 40/67; G06F 21/602; G06N 3/045; G06N 3/08; G06T 7/0012; G06T 2207/30088; G06T 2207/20081; G06T 2207/20084; G06T 2207/30201; G06V 10/454; G06V 10/82; G06V 40/171; G06V 40/174; G06V 40/18; G06V 2201/03

See application file for complete search history.

(56) References Cited

U.S. PATENT DOCUMENTS

| | | |
|---|---|---|
| 2016/0014129 A1 | 1/2016 | Park et al. |
| 2016/0095550 A1 | 4/2016 | Lin et al. |

OTHER PUBLICATIONS

Wahl et al., "WISEglass: Smart eyeglasses recognizing context", Proceedings of the 10th EAI International Conference on Body Area Networks, Sydney Australia, Sep. 30, 2015.
Japanese Patent Office, JP Examination Report for International Patent Application No. JP 2021-533321, Jul. 25, 2023.
Chinese Patent Office, Office Action, Chinese Patent Application No. 201980082057.1, Apr. 16, 2025.

* cited by examiner

WEARABLE ACTIVITY PARAMETER COLLECTING DEVICE AND MOUNTING UNIT THEREFOR

This application is the U.S. national phase of international application PCT/EP2019/083821, filed on Dec. 5, 2019, which claims the benefit of European application EP 18211553.5 filed on Dec. 11, 2018; all of which are hereby incorporated herein in their entirety by reference.

The present disclosure generally relates to the field of collecting parameters related to a patient or a user. More particularly, the present disclosure relates to a wearable activity parameter collecting device which is intended to be distributed to the patient or user, a mounting unit on which the wearable activity parameter collecting device is to be mounted and a system comprising the activity parameter collecting device and the mounting unit.

It has been proposed to derive a patient's physical/physiological condition by examining the patient's behaviour, habit, physiological parameters, health state, environment and/or life pattern (i.e. data about the patient). Based on the derived condition it is possible to individualise a medical treatment and/or preventive therapy of the patient. For example, visual behaviour of the patient assessed with such method allows to customise cataract surgery treatment by selecting the most suitable ocular implant (intraocular lens) and/or combination of implants for the patient's lifestyle. Such customisation is meant to address the patient's visual needs in the real-life settings and thus the patient's activity cannot be assessed in the clinic or doctor's office. Also, due to limited time and space that can be assigned to each patient in the clinic, it is undesirable to perform such investigation in a clinic, especially when the data on the patient is to be gathered for a long period of time in real life settings during daily routine.

The patient might benefit from continuous observations of the health condition performed with a monitoring device. This may be the case if the patient is in a risk of developing an acute event or rapid deterioration of the health condition, when continuously collected data may hint in advance on the impeding event and may allow to take preventive measures. In a similar usage scenario, continuous observations may help to diagnose the health condition, the patient's adherence to the therapy or medication plan, or help to better fit the therapy to the patient's lifestyle.

For this purpose, devices that are designed to collect such data on patients can be distributed to the patients to be used outside of clinical settings as well as in clinical settings without supervision by the healthcare service provider. With these distributed devices, the data can be gathered while the patient lives his/her daily life.

Since the collected data from multiple patients should be evaluated and this evaluation should be patient-specific, it is necessary to be able to link the collected data sets to the patients respectively. The straight-forward technical way of implementing the foregoing is to set a patient identifier (ID) on each of the data collecting devices for each of the patients. The patient IDs might be preconfigured in a device. In each device the collected data is stored together with the patient ID of the respective patient (data is tagged) and then uploaded to a storage database (or a cloud server), where the data can be found using the assigned patient ID.

In certain cases it may be beneficial for the healthcare service provider to outsource the device handling to the third-party device handling organisation (I.e. a distributor). The distributor in this context can be understood as a device handling organisation, which provides the service of managing and distributing devices. The distributor may be a commercial distributor, a pharmacy, a clinic or an individual. The distributor provides services of handling devices, such as configuring and preparing devices, distributing devices to a plurality of clinics or directly to the patients, collecting devices from clinics or directly from patients, resetting and cleaning them for the next patients and the like. The distributor may involve logistics partners to perform device delivery and collection.

Within this service model, an address or an identity of the patient has to be shared with the third party (e.g. the distributor) in order to send the device to the patient. Further, if the third party supports the upload of the collected data to a cloud storage, this party becomes aware of more personal information of the patient based on the data, along with address and identity. On each level of the device distribution chain outside of the clinic there is a risk of the patient's personal data being compromised, copied or tempered. It seems critical in view of personal data privacy and protection to ensure the safety of data along the data and/or data collecting device transit.

It is thus an object of the present disclosure to provide devices facilitating an easy handling by the patient while enhancing data protection, According to a first aspect of the present disclosure, a wearable activity parameter collecting device is provided. The wearable activity parameter collecting device comprises a reading interface unit and a transmitting unit. The reading interface unit is adapted to read out a measurement session identifier from a mounting unit. The transmitting unit is adapted to transmit the measurement session identifier and data to a memory device. Since there is no link between the e.g. randomly generated measurement session identifier and patient identity, the stored measurement data cannot be linked to the patient. The e.g. sensitive data, which might fall in the scope of data privacy of the patient can be efficiently protected in this way, since no personal information such as a name, an address or the like is required and/or disclosed. Instead, the measurement session identifier may be used to assign the data to the patient in the clinic.

In this way a measurement and/or data storage device can be separated from keys for data tagging, encryption and/or decryption. As a consequence, a device can be provided facilitating an easy handling by the patient while enhancing data protection.

The measurement session identifier may be defined as information (or an identifier) indicating a measurement session. The measurement session identifier might not include any personal/private information about the respective patient. The measurement session may be understood as the period of time during which a patient or user used the wearable activity parameter device for collecting the data. During the measurement session, the wearable activity parameter collecting device operates to collect and/or store the data about the patient (who can be referred to as a 'subject', 'user' or 'wearer') who uses it. The measurement session identifier may be pre-determined for and/or saved in the mounting unit. Alternatively, the measurement session identifier may be set by the patient, clinic or another party, different from the device handling party.

The mounting unit may be adapted to be arranged on a wearable device such as spectacles. The wearable device may be any device that can be worn by a patient or user. The mounting unit may be configured to hold the wearable activity parameter collecting device. In this way, the mounting unit and the wearable activity parameter device can be detachably attached to one another. The wearable activity parameter collecting device may be mounted on the mounting unit. By separating the mounting unit from the wearable activity parameter collecting device or vice versa, it becomes possible that the mounting unit is distributed to the patient as disposable (to be used by him/her in private), while the wearable activity parameter collecting device, which is normally more expensive than the mounting unit, can be rented or leased out to the patient. Further, the wearable activity parameter collecting device can be easily attached to wearable devices such as spectacles by attaching the wearable activity parameter collecting device a wearable device such as spectacles via the mounting unit. In other words, the wearable activity parameter collecting device may be attached to the mounting unit and the mounting unit can be arranged on the wearable device, The mounting unit can be easily arranged on the wearable device such as spectacles. This facilitates the handling of the activity parameter collecting device and the whole system.

The wearable activity parameter collecting device may further comprise a sensing unit and/or a processor. The sensing unit is adapted to acquire the data. The data may include activity parameters. The activity parameters may be defined as parameters which are related to activities of the patient. The processor is adapted to assign the measurement session identifier to the acquired data, The processor may control other units, applications and/or devices working within/with the wearable activity parameter collecting device.

The memory device is adapted to store the data with the measurement session identifier. The measurement session identifier may be stored in the memory device with a link to the data. Alternatively, the measurement session identifier may be inserted into the data and then stored together with the data. The memory device may be realised/implemented inside and/or outside of the wearable activity parameter collecting device. In case the memory device is implemented outside of the wearable activity parameter collecting device, it may be realised in a cloud server to which the data on the patient is transmitted.

The reading interface unit may be adapted to read out an encryption key assigned to the mounting unit. The processor may be adapted to encrypt the data with the encryption key. In this way, data protection of the patient is enhanced, i.e. personal data of the patient is protected in an improved way.

The measurement session identifier may comprise, serve as or correspond to the encryption key. Alternatively, the encryption key can be set by the patient, distributor, technician or clinic independently from the measurement session identifier. By way of encrypting the data assigned to the patient (i.e. assigned to the mounting unit distributed to the patient), data protection can be ensured even more/better when the data is transmitted via a wired/wireless communication network.

The reading interface unit may be adapted to read out a mounting unit identifier from the mounting unit. The processor may be adapted to assign the mounting unit identifier to the data. The memory device may be adapted to store the data with the measurement session identifier and the mounting unit identifier. The mounting unit identifier may be defined as information (or an identifier) specifying the mounting unit. Different mounting unit identifiers may be set for and thus identify different mounting units. In this way, one patient can use multiple wearable devices (e.g. spectacles) each of which equipped with a respective mounting unit. The mounting unit may be a part of the wearable device (e.g. spectacles). When the patient intends to wear one of the wearable devices (e.g. spectacles) he/she can attach the wearable activity parameter collecting device to the respective mounting unit of the wearable device he/she is intending to wear. Further, during the analysis, the collected data can be differentiated not only between users but between the wearable devices the user was using/wearing. For example, assuming that each mounting unit is used for only one pair of spectacles, the wearable activity parameter collecting device can register which spectacles the patient was wearing and how frequently he/she was changing them.

The activity parameters may include at least one of a distance between the sensing unit and one or more objects, a parameter of ambient light, a history of usage of mounting units, statics of usage of mounting units, frequency of changes of mounting units and, correspondingly, e.g. spectacles, a physiological parameter of a wearer, a location or position of the sensing unit, an orientation of the sensing unit, environmental parameters, images of the wearer and surrounding, or a movement of the wearer.

According to a second aspect of the present disclosure, a mounting unit is provided. The mounting unit may be adapted to be arranged on spectacles or other wearable devices. The mounting unit comprises one or more mounting components, an interface unit and an interlocking unit. The one or more mounting components are adapted such that the mounting unit can be arranged on a wearable device such as spectacles. In other words, the one or more mounting components are adapted to enable the mounting unit to be arranged on the wearable device such as spectacles. The interface unit is adapted to pass a measurement session identifier to a wearable activity parameter collecting device such as the wearable activity parameter collecting device according to the first aspect described above. The interlocking unit is adapted to hold the wearable activity parameter collecting device to be attached to the mounting unit.

The one or more mounting components may comprise or be configured as one or more elastic bands, The one or more elastic facilitate that the mounting unit can be securely arranged on a wearable device such as spectacles.

The mounting unit has an encryption key which is used for encrypting data. The interface unit is adapted to pass the encryption key to the wearable activity parameter collecting device. The encryption key may be stored or saved in the mounting unit as digital data or presented on the mounting unit as readable characters, signs and/or numbers.

The mounting unit may have a decryption key which is used for decrypting the data encrypted by using the encryption key. The decryption key may be set by the patient or be equivalent to the encryption key. The decryption key may be stored or saved in the mounting unit. The decryption key may have a human-readable form such as a character string. The decryption key may be presented as an image such as a barcode and/or a two-dimensional barcode suitable for reading by a computer vision imaging device.

The decryption key may be equal to the encryption key. The decryption key may be securely stored separately from the mounting unit, for example, in the patient sheet provided with the set of the mounting units. In this case the encryption key stored on the mounting unit may only be used for one-way encryption of the data but is not helpful for data decryption. Thus, even if the mounting unit is lost along with the device containing personal data in encrypted form, it does not allow to decrypt the personal data. The decryption key, being separately stored (e.g. at the patient's home) allows the patient or healthcare service provide to access the data on the cloud, when needed.

The interface unit may include a conductive pad or an antenna. The conductive pad may be adapted to pass a mounting unit identifier, the measurement session identifier, the encryption key or the decryption key by using an electric signal, When a conductive pad is used, the wearable activity parameter collecting device may have a conductive pad which is a counter part of the conductive pad implemented in the mounting unit, and which can be referred to as a reading interface. The antenna may be adapted to pass in a contactless way the mounting unit identifier, the measurement session identifier, the encryption key or the decryption key by using electro magnetic fields. The mounting unit may have an independent power supply and actively communicate the information, or it might be able to gather power from the interrogating radio waves of the reading interface. When an antenna is used, the wearable activity parameter collecting device may have an antenna which is a counter part of the antenna implemented in the mounting unit, and which can be referred to as the reading interface.

According to a third aspect of the present disclosure, a set of a plurality of mounting units according to the second aspect is provided. Each of the plurality of mounting units may be configured as the mounting unit described herein. Each of the plurality of mounting units includes the same measurement session identifier. In this way, each of the plurality of mounting units collects data for the same measurement session and thus indirectly for the same patient. Each of the plurality of mounting units includes a mounting unit identifier which is different from the mounting unit identifier of the other mounting units. In this way, the different mounting units can be differentiated.

More than one mounting unit may be distributed to the patient for the same measurement session, i.e. to collect data in the same measurement session. The patient is then able to arrange the multiple mounting units to several wearable devices such as spectacles, respectively, Thus, the patient may simply attach and/or detach the wearable activity parameter collecting device to and/or from the mounting units whenever he/she changes the wearable devices such as spectacles. In this way, user convenience can be improved. Further, by doing so, more data such as frequency of changing wearable devices such as spectacles, required number of wearable devices such as spectacles for the patient and/or usage time and/or ratio for certain wearable devices such as spectacles can be efficiently collected.

According to a fourth aspect of the present disclosure, a system comprising the wearable activity parameter collecting device according to the first aspect and one or more the mounting units according to the second aspect is provided.

By means of the present disclosure data privacy can be enhanced, Further, there is no need for the patient and the device-handling party (distributor of the devices and/or system described herein) to consent in advance to any data privacy and protection. Thus, data collection and subsequent data evaluation can be improved for the patient, clinic and/or distributor.

By way of the above, the party handling the device and data would not have means to access the personal data collected by the measurement device, since the required keys are not known. The most convenient way is to store the keys on a separate physical object with a memory and facilitate reading of the required information by the measurement device. Such physical object with the memory can be for example a mounting unit which facilitates attachment of the measurement device to spectacles or to the body of the patient, The keys can be generated randomly and stored on the mounting unit. The mounting unit can be distributed through separate channels, like through the clinic or pharmacy, and/or in the sealed package which does not allow reading of the keys without breaking packaging seals.

In one implementation, an encryption key and a measurement session identifier are stored on the mounting unit, while a decryption key required for data access is securely stored in human-readable but concealed form on a scratchable card/scratchcard. While unauthorised access to the measurement session identifier and encryption key might happen, the unauthorised access to the decryption key cannot be done unnoticed since it would require breaking seals and/or protection layers, With this the unauthorised user is not able to access the data collected on the device without being noticed even provided with physical access to the device. The data can be linked to the patient and decrypted only when needed. For example, when the patient arrives at the clinic for consultation he/she can provide the information for linking and/or decryption, which is stored on the mounting unit or provided in another way along with mounting unit, for example in a human-readable form in the user information sheet supplied with the mounting unit.

In the following, the present disclosure will further be described with reference to exemplary implementations illustrated in the figures, in which.

In the following description, for purposes of explanation and not limitation, specific details are set forth in order to provide a thorough understanding of the present disclosure. It will be apparent to one skilled in the art that the present disclosure may be practiced in other implementations that depart from these specific details.

Those skilled in the art will further appreciate that functions explained herein below may be implemented using individual hardware circuitry, using software functioning in conjunction with one or more processors, e.g. a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor arrangement and a memory arrangement coupled to a processor arrangement, wherein the memory arrangement is encoded with or stores one or more programs or corresponding code to cause the processor arrangement to perform or control the methods disclosed herein when executed by the processor arrangement.

Figure 1:
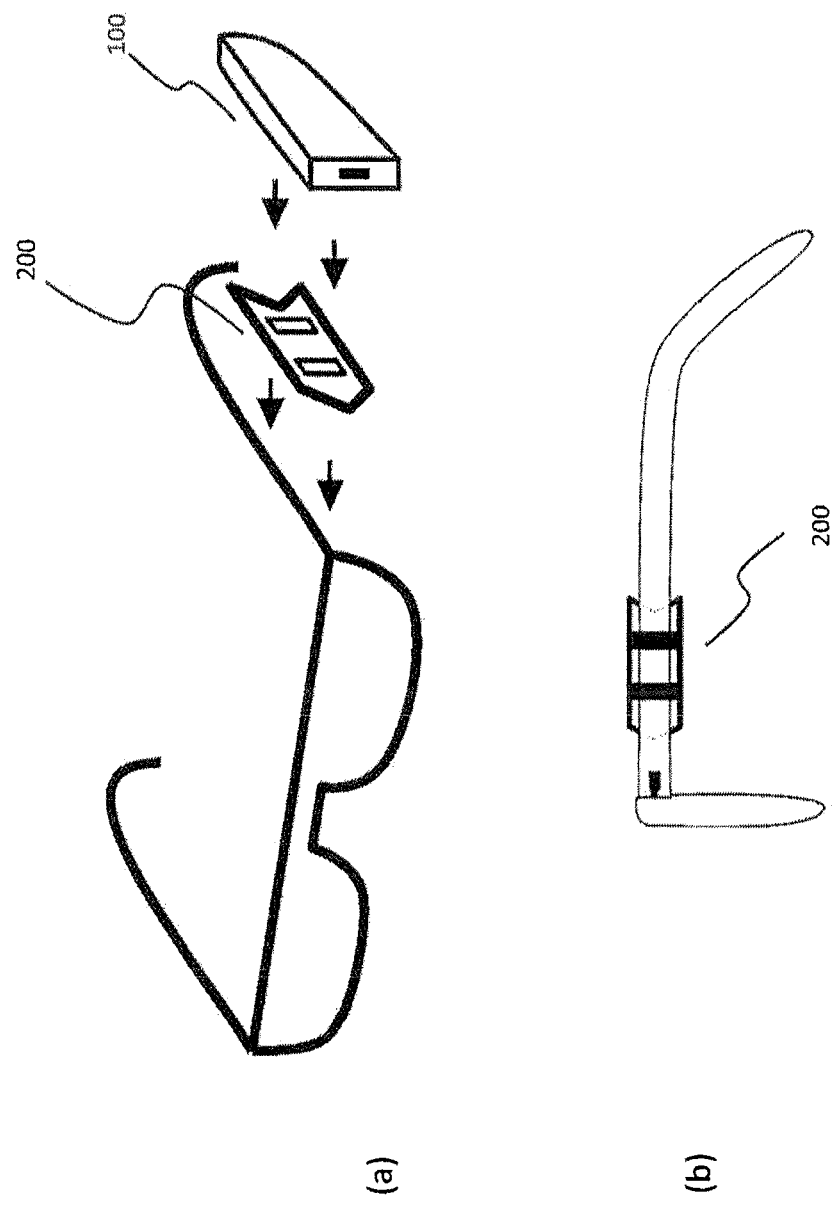
FIG. 1 illustrates an example of a system for collecting data about a patient and an activity of a patient.

FIG. 1 illustrates an example of a system for collecting data about a patient and an activity of a patient. The system may comprise a wearable activity parameter collecting device 100 and one or more mounting units 200.

Referring to FIG. 1(*a*), the mounting unit 200 (exemplifying one or more mounting units 200) is arranged or attached on spectacles as an example of a wearable device. However, the mounting unit 200 may be attached to other wearable devices than spectacles. The wearable activity parameter collecting device 100 is attached to the mounting unit 200.

Referring to FIG. 1(b), the mounting unit 200 has elastic bands. By means of the elastic bands, the mounting unit can be arranged on the spectacles.

In order to ensure that personal (privacy) information of patient data (data about the patient) is sufficiently protected when/after it is collected and transmitted to a storage (cloud) server, an identifier module may be used, which may contain the identifier, unique to the measurement session. In this scenario, the patient receives or leases a device (e.g. wearable activity parameter collecting device 100) from a clinic or a distributor. The patient may obtain in a pharmacy, in the clinic or distributor, one or more initialization modules (e.g. the identifier module) to which an identifier is saved, or the identifier is presented on a surface of the identifier module such that the identifier is both machine and human-readable. The identifier can be referred to herein as a measurement session identifier. In case of more than one identifier modules, the same measurement session identifier may be set to these several modules. Further, in case of more than one identifier modules, the patient may obtain more than one mounting unit. The number of identifier modules may correspond to the number of mounting units. The measurement session identifier may be understood as information (or an identifier) indicating a measurement session, A measurement session may be understood as the time period duration during which the same patient collects data using the wearable activity parameter collecting device 100. This may be independent of whether one or more mounting units 200 are used.

The identifier module may be realised as an integrated circuit with an electronic memory which stores the relevant identifiers (measurement session identifier, and/or mounting unit identifier) and keys.

During an initialization process, the measurement session identifier is read out by the wearable activity parameter collecting device 100. For example, this may be done/performed via contact pads, electromagnetic field communication, using radio-frequencies, optically and/or the like. Then, the wearable activity parameter collecting device 100 may collect, e.g. by measurement, the data from the patient and patient's activities. The data is then stored in an internal and/or external memory of the wearable activity parameter collecting device 100 together with the measurement session identifier. At a later point of time (e.g. after one or more of such measurement procedures) the data may be uploaded to a cloud server together with the measurement session identifier. The upload may be performed via a wireless network such as cellular networks or via WiFi, Bluetooth, AirPlay, DLNA and/or UPnP interfaces at the distributor and/or clinic. After the upload, the data may be stored and locked on the cloud server. The data can be identified (tagged) and thus distinguished from other data (i.e. data from another patient and/or data from another session of the same patient) by the measurement session identifier.

The data may be stored in such a manner that it is not accessible without knowledge of the measurement session identifier, Authorization to access this data is not given to anyone until the patient explicitly gives his/her consent for processing of the collected data by sharing the identifiers or keys with a service provider. For example, the patient may verbally communicate the measurement session identifier or key to the data user (the healthcare provider or clinic) on the phone inquiry and/or when visiting a clinic for consultation and/or using other secure communication channels between the patient and healthcare service provider. The patient may physically provide the mounting unit/identifier module to the healthcare service provider. This allows the clinic to access the personal data of the patient, analyse it and provide health care services based on this data. In case the correct mounting unit or key is provided, the data is unlocked and linked to a clinic account and/or a patient electronic medical record system of the clinic. The data may be encrypted in the wearable activity parameter collecting device 100, so that the encrypted data cannot be processed until it is unlocked by the patient and the clinic has the consent from the patient.

In this way, the patient is not required to visit the clinic or distributor beforehand for signing consent papers regarding his/her personal data before the patient even starts collecting data, i.e. the measurement session. That is, the wearable activity parameter collecting device 100 and/or the one or more chip cards may be provided to the patient before he/she actually gives his/her consent e.g. by visiting a clinic or distributor. The patient may start the measurement session before signing all the consent papers while the data is still protected. Equally, the patient is able to change his mind about his/her willingness to share collected data with a clinic or other party by not providing access key (e.g. measurement session identifier). This can be done at any stage of measurement sessions, even when the data has been completely uploaded to the storage server. Consequently, time and costs for the patient and clinic can be efficiently reduced.

Further, according to the present disclosure, collection of physiological signals, such as vital signs, blood pressure, glucometer, sleep pattern and/or the like can be performed in the home settings, so that the patient does not need to stay longer in the clinic in order to carry out these measurements.

Alternatively, the measurement session identifier can be stored on a separate chip card/identifier module. The identifier module (i.e. chip card) may be inserted into the wearable activity parameter collecting device 100 and the wearable activity parameter collecting device 100 is then able to access the measurement session identifier, Alternatively, the identifier module may be inserted into the mounting unit 200 which can be arranged on the spectacles and is adapted to hold the wearable activity parameter collecting device 100. In this case, the wearable activity parameter collecting device 100 is capable of reading out the measurement session identifier from the identifier module inserted into the mounting unit 200. Alternatively, the identifier module may be integrated into the mounting unit 200 and it is then sufficient to provide the mounting unit to the patient instead of the identifier module in addition. This simplifies the handling of the system, even by patients with reduced motoric skills, since the identifier module does not have to be inserted and/or applied to the wearable activity parameter collecting device but is pre-installed/integrated in the mounting unit 200.

As depicted in FIG. 1, the wearable activity parameter collecting device 100 may be is mounted/attached on/to the mounting unit 200. The mounting unit 200 is adapted to be attached to spectacles or other wearable devices. For example, elastic bands or other physical/mechanical/structural holders can be used for attaching the mounting unit 200 to spectacles. Magnets or any physical/mechanical/structural holders arranged at either or both of the wearable activity parameter collecting device 100 and mounting unit 200 may be used to attach the wearable activity parameter collecting device 100 to the mounting unit 200. Since the mounting unit 200 may be more likely to get in touch with the patients skin, the mounting unit 200 may be disposable for hygienic reasons.

With this structure, the patient having multiple wearable devices such as multiple spectacles is able to install one of a plurality of mounting units to each of the multiple wearable devices such as multiple spectacles. Thus, even when the patient changes the wearable device, he/she merely has to reattach the wearable activity parameter collecting device 100 to the mounting unit 200 of the wearable device he/she is intending to wear, thereby continuing with the measurement session. Handling of the wearable activity parameter collecting device 100 is thereby simplified. At the same time, it can be recognized during the measurements session which of the multiple spectacles is currently used by the patient (by checking to which mounting unit 200 the wearable activity parameter collecting unit 100 is attached). This can be done by way of a mounting unit identifier which uniquely identifies each of the mounting units and communicating it to the wearable activity parameter collecting device 100 along with the measurement session identifier.

For instance, the identifier module may be integrated into the mounting unit 200. The patient may receive or buy a package including plurality of mounting units 200 and even spectacles or/and spectacle frames with an integrated mounting unit interface. Each of the mounting units 200 may have the same measurement session identifier. Each of the mounting units 200 may have a mounting unit identifier different from those of the other mounting units 200. The package may be for single use, since the mounting units 200 and spectacles may be disposable. The clinic or the pharmacy or the distributor may sell or provide the package to the patient. The patient may loan the wearable activity parameter collecting device 100 (e.g. for multi-use) from the clinic, distributor or pharmacy. The patient may attach the mounting units 200 to his/her multiple spectacles, respectively, When the wearable activity parameter collecting device 100 is attached to one of mounting units 200, it may read out the measurement session identifier and/or the mounting unit identifier. For example, the wearable activity parameter collecting device 100 may read out the measurement session identifier and/or the mounting unit identifier as soon as it is attached to one of mounting units 200.

When the patient changes spectacles, the same measurement session identifier may be read out, but a different mounting unit identifier assigned to the changed mounting unit 200. The data collected by the wearable activity parameter collecting device 100 may be stored together (tagged) with the measurement session identifier and/or the respective mounting unit identifiers. In the wearable activity parameter collecting device 100 the data with/without the measurement session identifier and/or the mounting unit identifier may be encrypted by using the key (e.g. the measurement session identifier) assigned to the package, The encrypted data may be transmitted to the cloud server. When the clinic obtains a valid consent of the patient and the key from the patient, the clinic may locate, decrypt, download and use the data from the cloud server using the key.

In terms of data protection, the above described system is advantageous. The processes in the system are absolutely patient agnostic and do not require any configuration. Even if a part of or the whole of the package is lost, it can be easily replaced and the risk of leakage of personal data, since no information is included therein which can be used to identify the patient.

Figure 2:
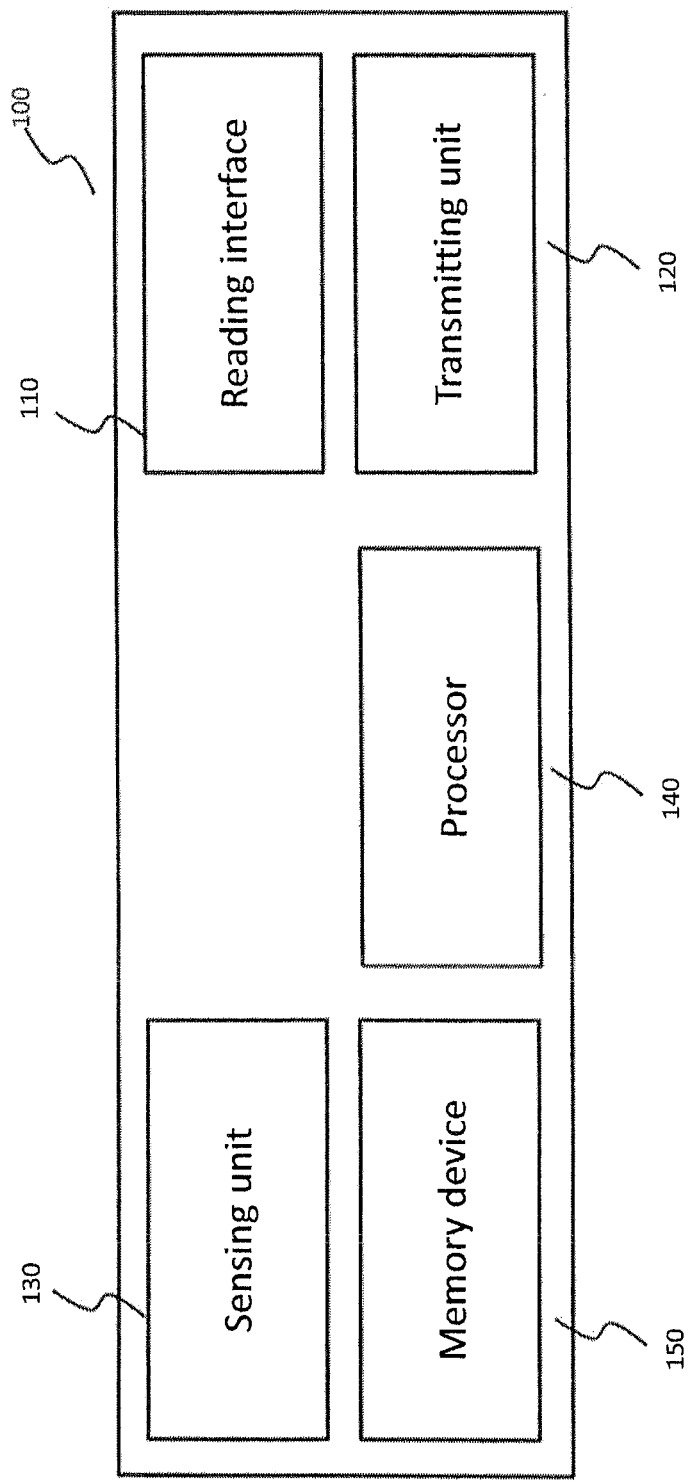
FIG. 2 illustrates an example of a wearable activity parameter collecting device.

FIG. 2 illustrates a block diagram of an example of a wearable activity parameter collecting device 100.

The wearable activity parameter collecting device 100 may comprise at least one of a reading interface 110, a transmitting unit 120, a sensing unit 130, a processor 140 and a memory device 150.

The reading interface 110 may be configured to read out a measurement session identifier from a mounting unit 200, The reading interface unit 110 may be configured to read out an encryption key assigned to the mounting unit 200. The reading interface unit 110 may be configured to read out a mounting unit identifier from the mounting unit 200.

The transmitting unit 120 includes a transmitter which may be configured to transmit the measurement session identifier and data to a memory such as the memory device 150 or another memory device.

The sensing unit 130 is adapted to acquire the data. The data may include activity parameters, The activity parameters may be defined as parameters which are related to activities of the patient, In the following, the sensing unit 130 will be described in more detail.

The processor 140 may be configured to assign the measurement session identifier to the acquired data. The processor 140 may control the other units, applications and/or devices working within/with the wearable activity parameter collecting device 100. The processor 140 may be configured to encrypt the data with the encryption key. The processor 140 may be configured to assign the mounting unit identifier to the data.

The memory device 150 may be configured to store the data with the measurement session identifier, The measurement session identifier may be stored in the memory device 150 with a link to the data. Alternatively, the measurement session identifier may be inserted into the data and then stored together with the data in the memory device 150. Alternatively, the measurement session identifier may be used as the encryption key for the personal data. The memory device 150 may be implemented/realised inside and/or outside of the wearable activity parameter collecting device 100. In case the memory device 150 is implemented outside of the wearable activity parameter collecting device 100, it may be arranged in a cloud server to which the data about/on the patient is transmitted. The memory device 150 may store the data together with the measurement session identifier and the mounting unit identifier.

Figure 3:
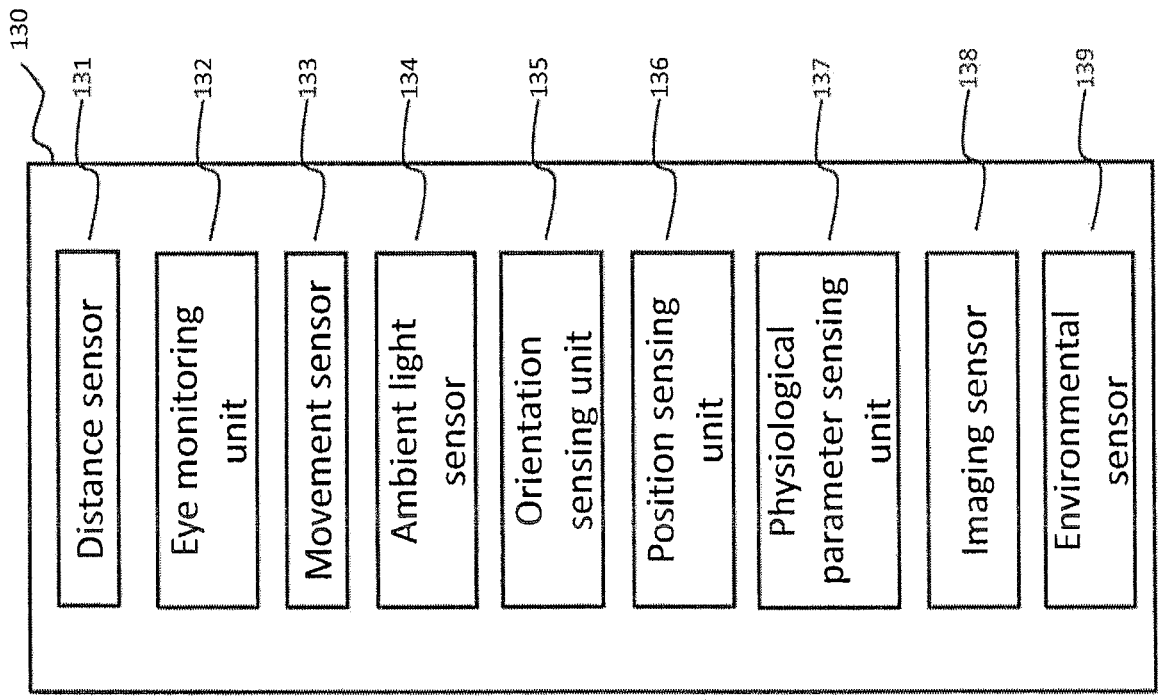
FIG. 3 illustrates an example of a sensing unit.

FIG. 3 illustrates a block diagram of an example of the sensing unit 130.

The sensing unit 130 may include one or more of a distance sensor 131, an eye monitoring unit 132, a movement sensor 133, an ambient light sensor 134, an orientation sensing unit 135, a position sensing unit 136, a physiological parameter sensing unit 137, an imaging sensor 138 and/or an environmental sensor 139. Any information or parameter collected or measured by the sensing unit 130 may be regarded as the data about the patient or the activity parameters.

The distance sensor 131 may be configured to measure one or more viewing distances. These viewing distances are distances between a user and one or more objects in the viewing direction of the subject (i.e. patient, user or wearer). It is possible that the distance sensor 131 may measure the one or more viewing distances actively or passively. Active measurement of the viewing distances may be performed as the distance sensor 131 automatically senses objects in a space where the wearable activity parameter collecting device 100 is located and measures the viewing distances to the objects. In this case, the viewing distances may be measured without consideration of the user's movements. For passive measurement of the viewing distances, the distance sensor 131 may measure a distance in a certain direction depending on the user's movements. In case the distance sensor 131 is configured to sense the viewing distances in the direction of the line of sight of the user by way of passive measurement, information of the object to which the user focuses can be acquired. For example, measuring a viewing distance may be performed multiple times to measure distances between the wearable activity parameter collecting device 100 and multiple points of the object. The viewing distances to the points in addition to directions to the points would result in information on the object. The information may include a position, a shape, an inclination, a size, a pose and/or a type/kind of the object. Alternatively, the information may include or be a topography around or about the object. It is possible that the visual activity can be derived from the information.

The eye monitoring unit 132 may be configured to detect the subject's eye direction relative to the distance measuring sensor's direction, e.g. viewing direction. The eye monitoring unit 132 may be configured to monitor parameters related to the visual activity and/or health status of one or both eyes. The eye monitoring unit 132 may sense at least one of movements of eyes, size of the pupils, blinking activity, tear film quality or change of the lens shape of the user. The eye monitoring unit 132 may determine an accommodation effort using at least one of a vergence derived from the sensed movements of the eyes, the size of the pupils and the change of the lens shape. When human eyes focus on an object, they perform coordinated adjustments in vergence, shape of the lens to change optical power and, correspondingly, focal length and pupil size, For example, monitoring of positions of both eyes can allow detection of the vergence, which is a simultaneous movement of both eyes in the opposite direction. Eyes move towards each other while focusing on near objects and move away of each over while focusing on distant objects. Changes of the shape of the lens can be monitored by tracking the reflections of the probing light from surfaces of the lens (for example, by analysing Purkinje reflections, such as P3 and P4). When focusing on a near object, pupils constrict in order to minimize image blurring. Pupil size can be measured with imaging or any other suitable method, The system can detect the accommodation by detection of pupil size changes. During the detection of the accommodation from pupil size, the system may compensate effects to the size of the pupil due to brightness which may be measured with the context sensors, such as ambient light sensor. The eye monitoring unit 132 or the processor 140 may calculate the viewing distance of the user based on the determined accommodation effort. The viewing distance can be defined as a distance to a point where the user is looking at, By tracking the accommodation effort using any of the mentioned features or a combination of two of more of them: vergence, lens shape change, pupil size, the system can track viewing distances that a user is using.

The eye monitoring unit 132 may monitor progression of eye diseases, such as dry eye disease/symptom. In one implementation, the eye monitoring unit 132 may sense at least one of the blinking frequency, blinking completeness and blinking regularity, and derive metrics related to the severity of dry eye disease. A system may be configured to provide the patient with the corrective feedback to change his/her behaviour in order to reduce risks.

The movement sensor 133 may be configured to measure movements of the subject's body. In the present example, the movement sensor 133 may or may not comprise an inertial measurement unit, an accelerometer and/or a gyroscope, and may or may not further comprise different sensors like a magnetometer, an altimeter, a pedometer or a geopositioning device, for example. The movements including displacements of the wearable activity parameter collecting device 100 may be measured by the movement sensor 133.

The ambient light sensor 134, which may be extended by using an additional colour sensor, may be configured to measure ambient light and/or light intensity and/or spectral content in the subject's viewing direction. The ambient light sensor 134 may be incorporated in or may incorporate an ultraviolet light sensor.

The orientation sensing unit 135 may be configured to determine orientations of the wearable activity parameter collecting device 100. The orientation sensing unit 135 may be configured to measure angles of the wearable activity parameter collecting device 100 relative to an origin point. The angles may be defined to include a vertical angle (vertical orientation) and/or a horizontal angle (horizontal orientation). The origin point may be defined in different ways. As one example, a position of the wearable activity parameter collecting device 100 when it is powered on may be the origin point. Or it may be possible that the user sets the origin point manually, e.g. by pressing a button or providing a control command to the wearable activity parameter collecting device 100. The origin point may be derived statistically from a set of points. The origin point may be defined in relation to an absolute coordinate system, like the earth magnetic and/or gravitational field, The origin point may be construed as an origin of a 3-dimensional coordinates system. In these examples, a forward direction of the wearable activity parameter collecting device 100 at the origin point may be utilized as a base line for measuring the horizontal and/or vertical orientations. The orientation sensing unit 135 may be implemented as or comprise at least one of an accelerometer, a gyroscope sensor, a magnetometer, an altimeter and a compass.

The position sensing unit 136 may be adapted to measure at least one coordinate of the wearable activity parameter collecting device 100 in space. The position sensing unit 136 may include at least one of geolocation systems such as the global positioning system (GPS), GLONASS or GNSS sensors, an indoor positioning system and a hybrid positioning system. Elevation as well can be measured from the position sensing unit 136 with an altimeter. The position sensing unit 136 may be adapted to measure positions of the wearable activity parameter collecting device 100 relative to an origin point. The origin point may be defined in the same manner as described above. The position can be derived indirectly by sensing motions of the wearable activity parameter collecting device 100 and performing position estimation based on motions (e.g. dead reckoning/path integration).

The physiological parameter sensing unit 137 may measure physiological parameters of the patient. The physiological parameters may include vital signs, body temperature, blood pressure, blood content, blood flow and dynamics, heart rate, blood oxygenation, concentration of blood glucose and/or other analytes, sleep pattern and/or the like.

The imaging sensor 138 may obtain images of the patient and/or patient surrounding to characterize the patient's environment and/or patient's facial expressions and/or activities.

The environmental sensor 139 may measure parameters of environments surrounding the patient, such as air or water temperature, air/atmospheric pressure, air humidity, air quality and/or pollutants concentration, etc. The environmental sensor 139 may incorporate the ambient light sensor 134.

Figure 4:
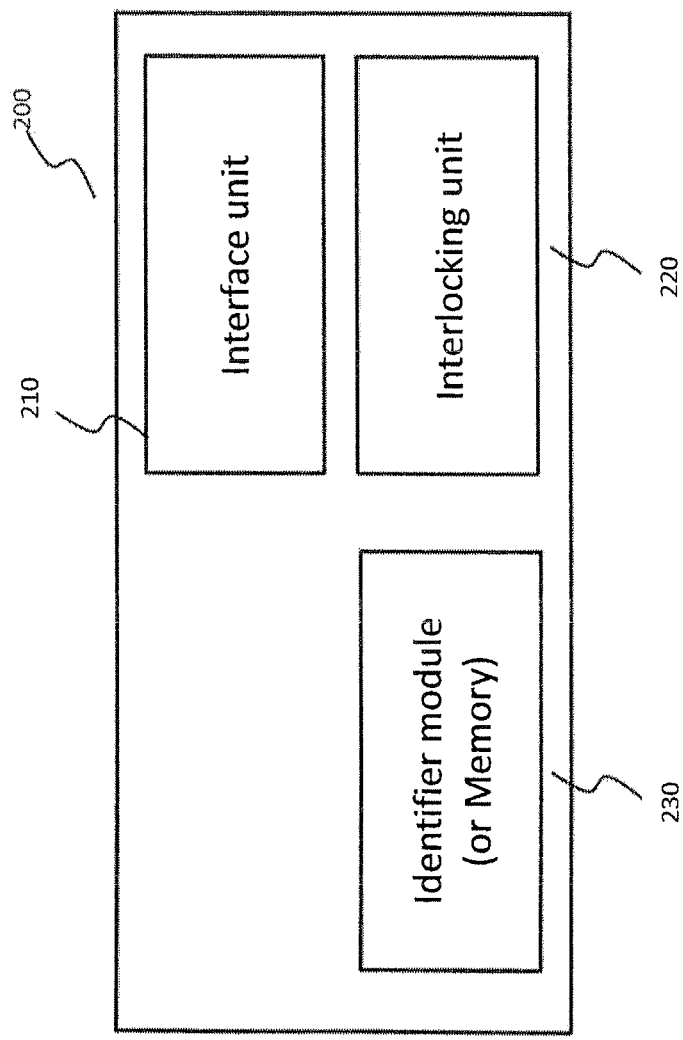
FIG. 4 illustrates an example of a mounting unit.

FIG. 4 illustrates a block diagram of an example of the mounting unit 200.

According to the example of FIG. 4, the mounting unit 200 may include at least one of an interface unit 210, an interlocking unit 220 and an identifier module (or chip card) 230.

The interface unit 210 may be configured to pass a measurement session identifier to the wearable activity parameter collecting device 100. The interface unit 210 may be configured to pass an encryption key to the wearable activity parameter collecting device 100. The interface unit 210 may include a conductive pad or an antenna or an optical label. The conductive pad is adapted to pass a mounting unit identifier, the measurement session identifier, the encryption key and/or the decryption key by using an electric signal. The antenna is adapted to pass the mounting unit identifier, the measurement session identifier, the encryption key and/or the decryption key by means of electromagnetic field communication and/or radio waves. The optical label is adapted to pass the mounting unit identifier, the measurement session identifier, the encryption key and/or the decryption key by using an optical and/or imaging signal. The optical label may have the form of barcode or two-dimensional barcode, The interlocking unit 220 may be adapted to hold the wearable activity parameter collecting device 100 to be attached to the mounting unit 200. The interlocking unit 220 may include a magnet or a physical/mechanical/structural holder which may itself be adapted to hold the wearable activity parameter collecting device 100.

The identifier module (or chip card) 230 may store the measurement session identifier and/or mounting unit identifier. The measurement session identifier and/or mounting unit identifier may be saved in the identifier module 230 or be presented on a surface of the identifier module 230 (or of the mounting unit 200 when the identifier module 230 is not detachable from the mounting unit 200), In case there is more than one identifier modules, the same measurement session identifier may be assigned to these multiple identifier modules. However, different mounting unit identifiers may be assigned to the respective identifier modules/chip cards, The functions of the identifier module 230 can be built-in into the mounting unit(s) 200.

Figure 5:
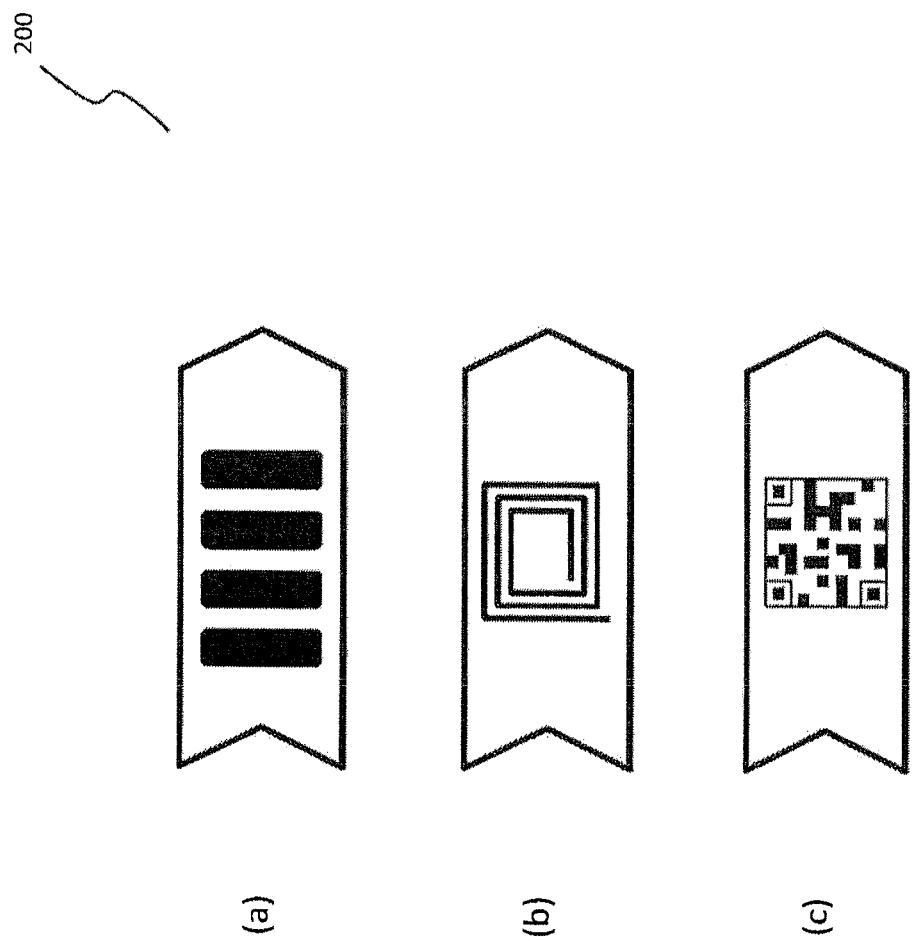
FIG. 5 illustrates examples of interfaces for linking the mounting unit with the wearable activity parameter collecting device.

FIG. 5 illustrates examples of interfaces for establishing a connection between the mounting unit 200 and the wearable activity parameter collecting device 100.

Referring to FIG. 5(a), one or more contacts/conductive pads/connectors may be used as the interface for linking the mounting unit 200 to/with the wearable activity parameter collecting device 100. An electrical signal containing the mounting unit identifier, measurement session identifier, encryption key and/or decryption key may be delivered to the wearable activity parameter collecting device 100 via the one or more conductive pads. When the one or more conductive pads are used, the wearable activity parameter collecting device 100 may have one or more corresponding connectors as a counter part of the contacts/conductive pads/connectors implemented in the mounting unit 200, and which can be referred as the reading interface 110.

Referring to FIG. 5(b), one or more antennas may be used as the interface for linking the mounting unit 200 with the wearable activity parameter collecting device 100. A radio signal containing the mounting unit identifier, measurement session identifier, encryption key and/or decryption key may be delivered to the wearable activity parameter collecting device 100 via the one or more antennas by means of electromagnetic field communication and/or using radio waves, When the one or more antennas are used, the wearable activity parameter collecting device 100 may have one or more corresponding antennas as a counter part of the antenna implemented in the mounting unit 200, and which can be referred as the reading interface 110.

FIG. 5(c) illustrates an arrangement with an optical label or optical active element as an electronic ink, liquid crystal display and/or one or plurality of light emitting diodes to communicate the encryption key and/or measurement session identifier.

The wearable activity parameter collecting device 100 is able to read out the information using optical sensors (e.g. ambient light sensor 134, imaging sensor 138 or environmental sensor 139) and configure accordingly. The optical communication channel has the advantage of potentially being concealed in the non-transparent packaging during transportation.

Figure 6:
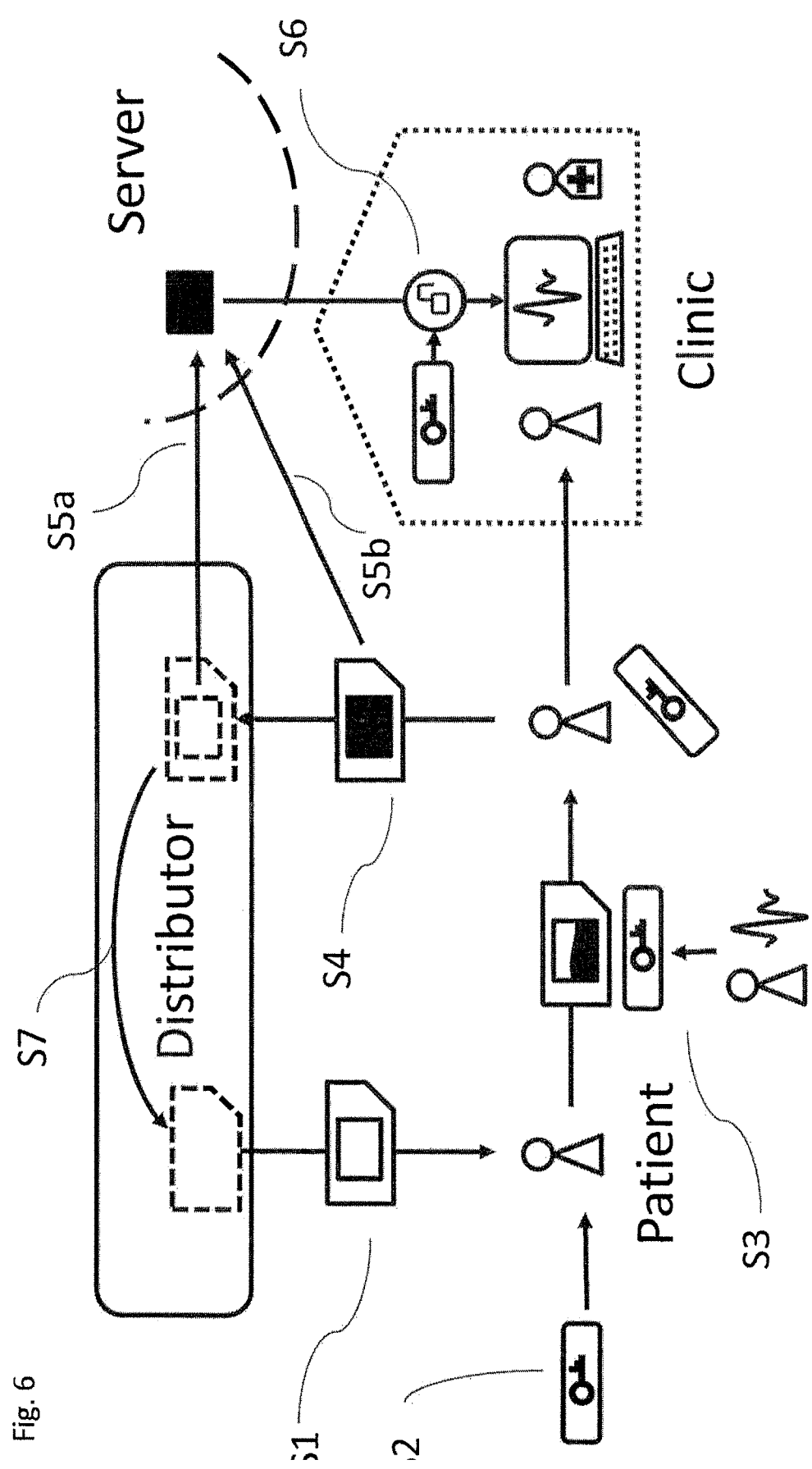
FIG. 6 illustrates the data and device transit paths.

FIG. 6 illustrates an example of the patient and data paths. The patient receives a blank wearable activity parameter collecting device 100 from a device handling party, e.g. distributor, clinic or pharmacy, etc. (step S1). The patient obtains an identifier module 230, which may be the package of one or more mounting units 200 with integrated identifiers (step S2), The patient arranges the mounting unit 200 on the spectacles and attaches it to the wearable activity parameter collecting device 100. The wearable activity parameter collecting device 100 reads out the measurement session identifier and encryption key, collects relevant patient data, stores and/or encrypts it using the measurement session identifier and encryption key, correspondingly (step S3). At the end of the measurement session the patient returns the wearable activity parameter collecting device 100 with the stored encrypted data to the device handling party and keep the identifier modules 230 and/or mounting unit 200 (step S4). The data is uploaded to the storage server (cloud) in the encrypted form using the distributor infrastructure, for example, a wireless network (step S5a). The wearable activity parameter collecting device 100 may have the capability to upload data directly on the server without the need of the additional infrastructure. In this way data may be already uploaded to the storage server (cloud) before it reaches the distributor (step S5b). On a visit to clinic, the patient brings the identifier module 230 and/or mounting unit 200 with the key required for accessing the data or communicates the key to the healthcare service provider (step S6). Using the measurement session identifier and/or decryption key the personal data of the patient can be accessed, decrypted, processed and analysed to customise the healthcare service for the patient. In case the decryption key is provided on the media, separately from the mounting unit 200 with the encryption key, the patient may have to communicate the decryption key only, In one implementation, a package may contain a paper sheet with patient information and a human-readable decryption key. The returned wearable activity parameter collecting device 100 is reset by the device handling party (distributor), cleaned and prepared for the next patient (step S7).

Alternatively, the patient might be asked to communicate to the healthcare service provider (data user) the decryption key and/or measurement session identifier before starting the session. In this arrangement the healthcare service provider might be able to follow the progress of personal data collection if the wearable activity parameter collecting device 100 has the capability to upload data to the storage server directly (step S5b). This also ensures that the patient has not forgotten to communicate the decryption key and measurement session identifier to the healthcare service provider.

Figure 7:
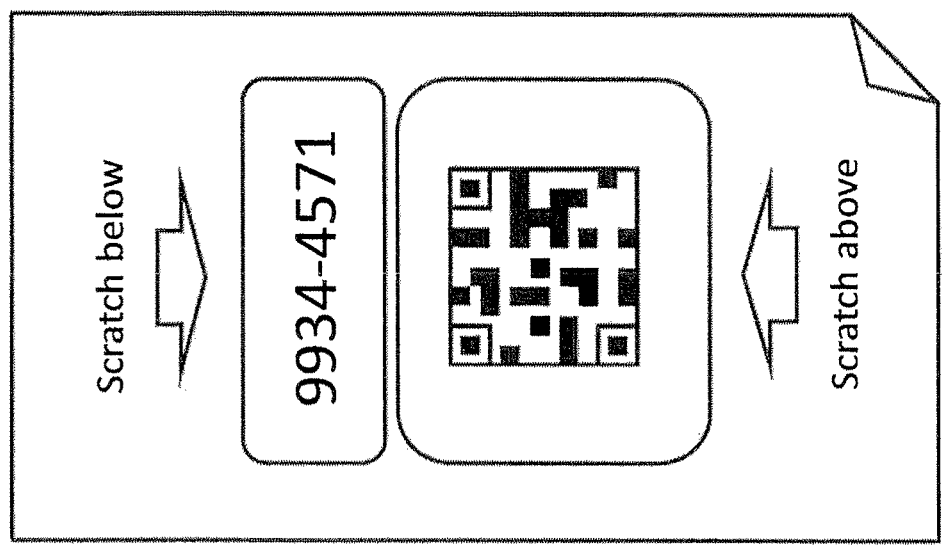
FIG. 7 Illustrates an example of a mounting units package delivered to the patient.
Figure 7:
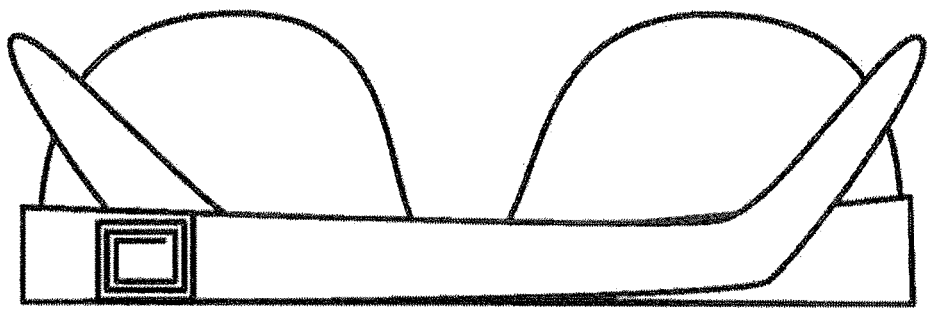
Figure 7:
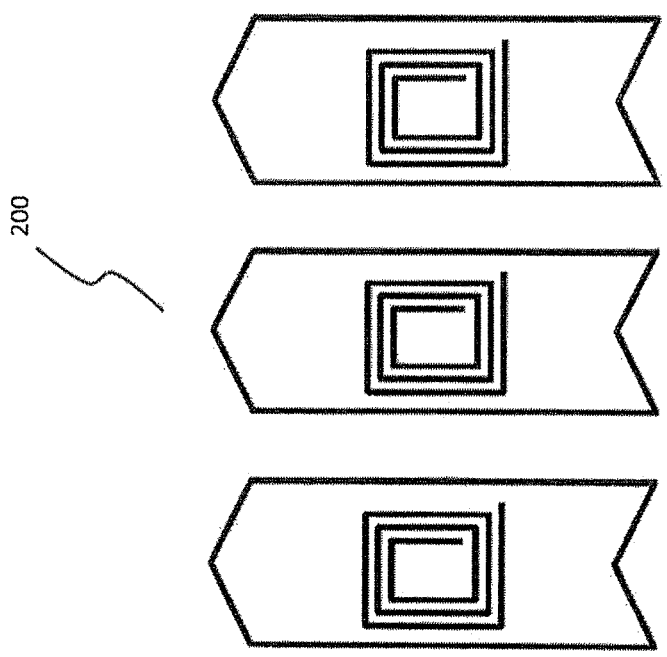

FIG. 7 shows an example of a mounting units package obtained by a patient. Several mounting units 200 in this example are equipped with a near field radio communication interface depicted with antennas and configured to communicate information to the wearable activity parameter collecting device 100. Each of the mounting units 200 communicates the same measurement session identifier and encryption key, but an individual mounting unit identifier. Spectacles with an embedded mounting unit can be provided, The mounting unit 200 of the spectacles communicates the same measurement session identifier and encryption key, but an individual mounting unit/spectacles identifier. The patient is also provided with the text sheet with an authorisation/decryption key in human-readable and/or machine-readable forms initially concealed by a scratchable opaque covering layer. In order to reveal the (authorisation) key and access data on the cloud, the patient or healthcare service provider may remove the covering layer.

By way of the technique described herein, it is possible to effectively provide personal sensitive data protection. Further, processes for handling collected data can be simplified, which results in improved efficiency.

It will be understood that the embodiments described above are merely exemplary and that the principles of the present disclosure may be practiced in other implementations.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A system comprising:
 a wearable activity parameter collecting device for being detachably mounted to a wearable device via a mounting unit, the wearable activity parameter collecting device comprising:
  a sensing unit comprising one or more of a distance sensor, an eye monitoring unit, a movement sensor, an ambient light sensor, an orientation sensing unit, a position sensing unit, a physiological parameter sensing unit, an imaging sensor and/or an environmental sensor, wherein the sensing unit is adapted to acquire data from one or more of the distance sensor, the eye monitoring unit, the movement sensor, the ambient light sensor, the orientation sensing unit, the position sensing unit, the physiological parameter sensing unit, the imaging sensor and/or the environmental sensor;
  an optical sensor adapted to read out a measurement session identifier indicating a measurement session from the mounting unit;
  a processor adapted to assign the measurement session identifier to the acquired data from the sensing unit; and
  a transmitting unit comprising a transmitter, and adapted to transmit the measurement session identifier and data to a memory device,
 characterized in that the optical sensor is further adapted to read out an encryption key assigned to the mounting unit, wherein the measurement session identifier is independent from the encryption key and wherein the processor is further adapted to encrypt the data with the encryption key.

2. The system of claim 1, wherein the optical sensor is adapted to read out the measurement session identifier once the wearable activity parameter collecting device is attached to the mounting unit.

3. The system of claim 1,
 wherein the mounting unit is adapted to be integrated into the wearable device, wherein the wearable device comprises spectacles.

4. The system of claim 1 wherein the mounting unit is adapted to detachably mount the wearable activity parameter collecting device to the wearable device, and comprises:
 one or more mounting components adapted such that the mounting unit can be arranged on the wearable device;
 an interface unit adapted to pass the measurement session identifier indicating the measurement session to the wearable activity parameter collecting device; and
 an interlocking unit adapted to hold the wearable activity parameter collecting device to be attached to the mounting unit,
 wherein the mounting unit further comprises the encryption key which is used for encrypting data, and
 wherein the interface unit is further adapted to pass the encryption key to the wearable activity parameter collecting device.

5. The system of claim 4,
 wherein the mounting unit further has a decryption key which is used for decrypting the data encrypted by using the encryption key.

6. The system of claim 5,
 wherein the decryption key is equivalent to the encryption key.

7. The system of claim 4,
 wherein the interface unit includes an antenna,
 wherein the antenna is adapted to pass the mounting unit identifier, the measurement session identifier, the encryption key or the decryption key by means of electromagnetic field communication, using radio waves or light.

8. The system of claim 4, wherein the one or more mounting components comprise or are configured as one or more elastic bands.

9. The system of claim 1,
 wherein the mounting unit comprises a set of mounting units, wherein each mounting unit of the set of mounting units has the measurement session identifier, and
 wherein each mounting unit of the set of mounting units has a different mounting unit identifier from all other mounting units of the set of mounting units.

* * * * *